Figure 1:
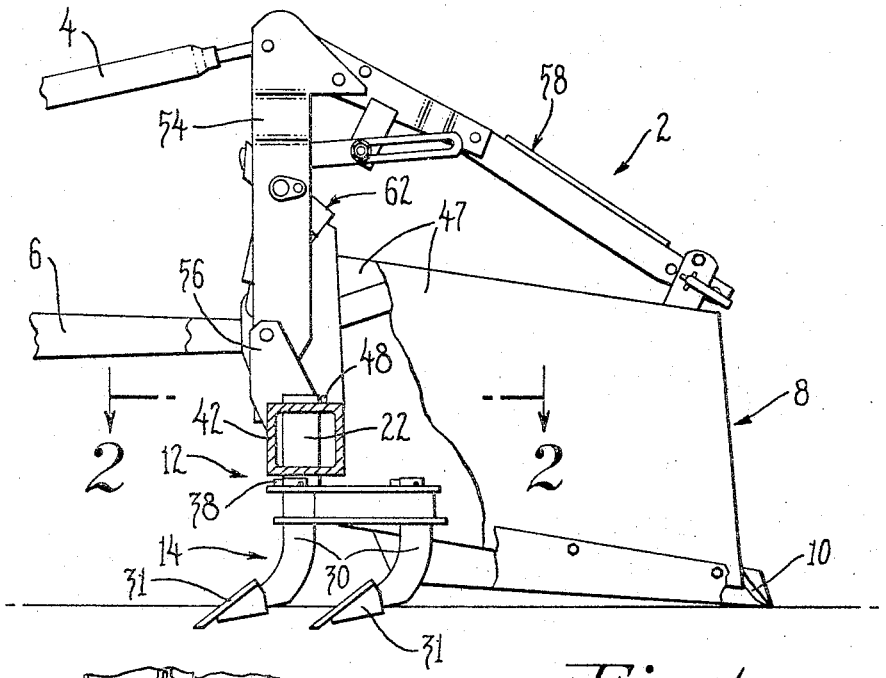
Figure 2:
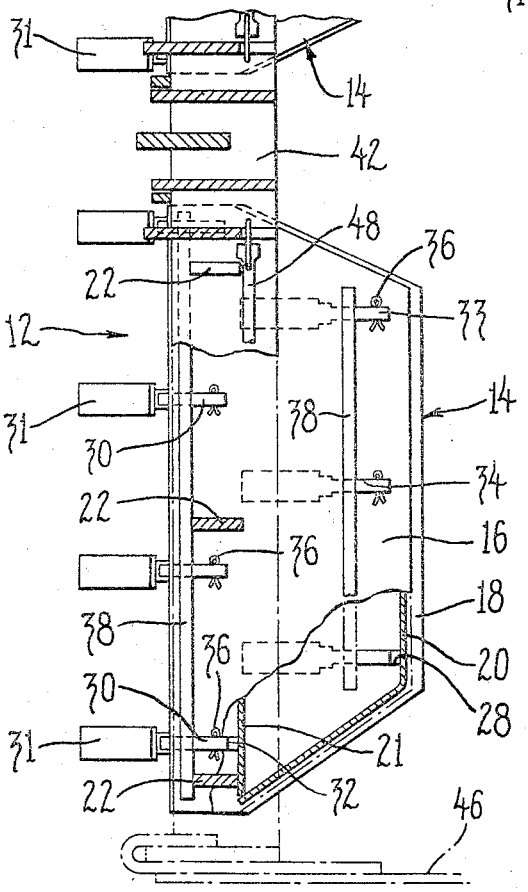
Figure 3:
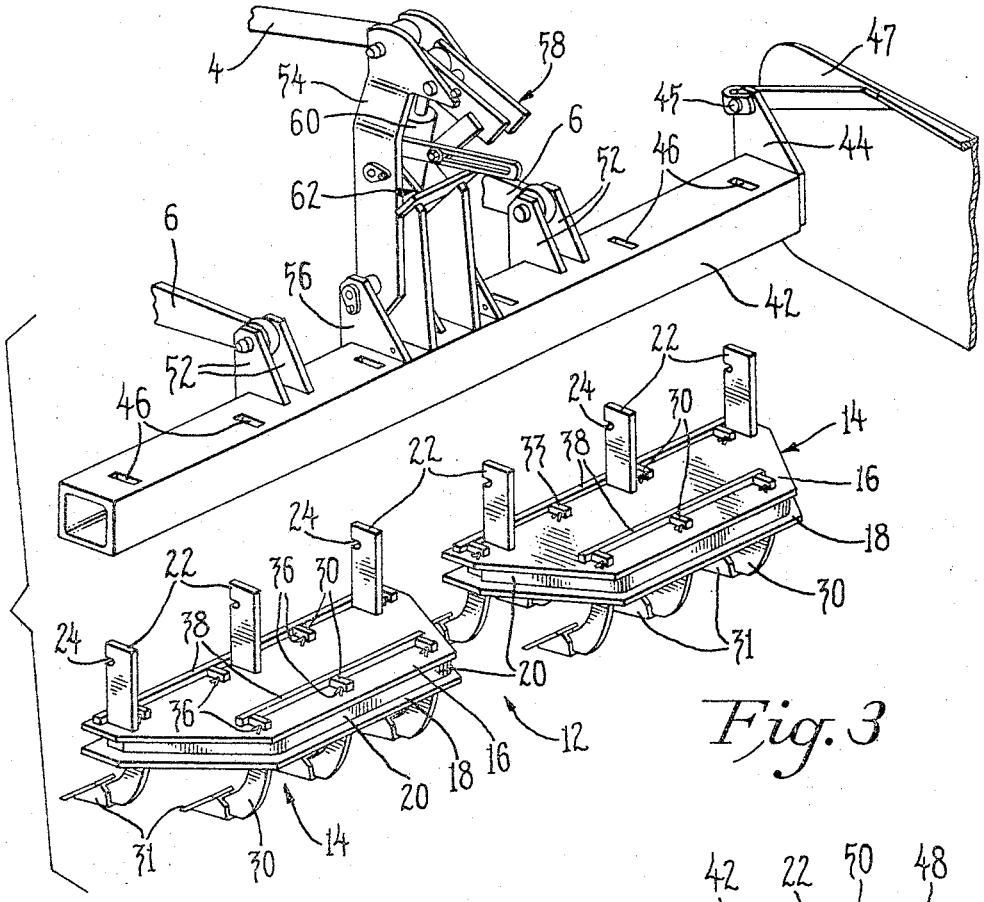
Figure 4:
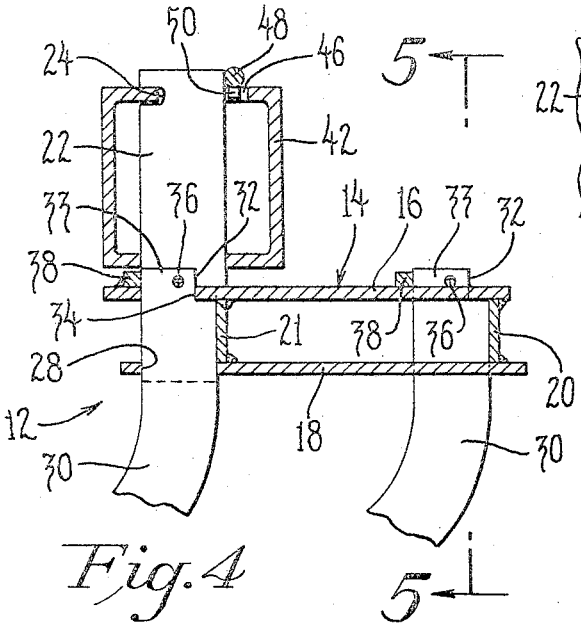
Figure 5:
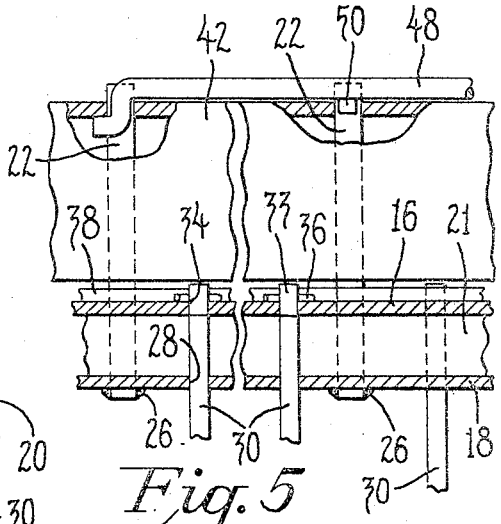

T 860,022

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1009

702,899
SCARIFYING TOOTH ATTACHMENT

Clarence B. Richey, Fresno, Calif., assignor to Massey-Ferguson Inc., Des Moines, Iowa, a corporation of Maryland

Filed Feb. 5, 1968. Published Mar. 25, 1969
Class 172—197
2 Sheets Drawing. 6 Pages Specification

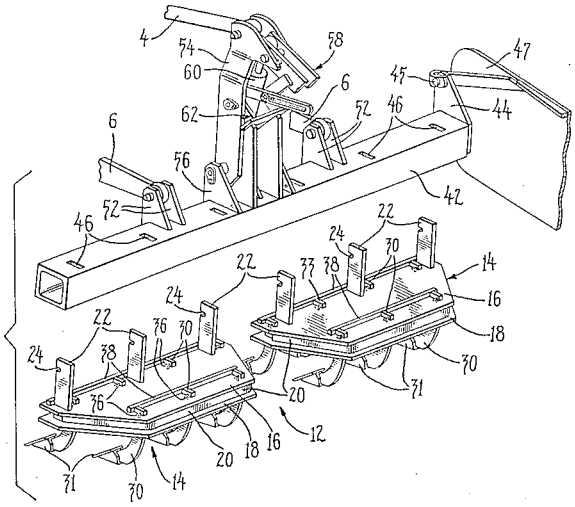

A scarifier-scraper implement is mounted on a conventional tractor three-point hitch. The implement includes a rectangular hollow transverse beam pivoted to the hitch lower links and pivoted to the hitch upper link by a frame member. Plates on the ends of the beam are pivoted to the sides of a box scraper. The beam includes laterally spaced pairs of vertically aligned slots in its upper and lower walls. A scarifier assembly includes a pair of flat vertically spaced plates that are interconnected by vertical wall members welded to the plates. Laterally spaced vertical legs interconnect the plates and extend upwardly for insertion through the bar slots and tongue-and-groove retention. Laterally spaced pairs of vertically aligned slots are provided in front and rear staggered rows in the plates. Scarifier teeth have shanks insertable into the plate slots for retention by cotter pins inserted into upper holes in the shanks. Lateral reinforcement bars on the upper plate and the vertical wall members abut the shanks to reinforce the teeth. The shank rear edges abut the vertical walls and are notched at their upper ends to engage the upper plate bottom. The two spaced and staggered rows of teeth permit fine scarifying.

T 860,022

SN - 702899

March 25, 1969 C. B. RICHEY DEF. PUB.

SCARIFYING TOOTH ATTACHMENT

Filed Feb. 5, 1968 Sheet 1 of 2

INVENTOR.
CLARENCE B. RICHEY
BY
Tweedale & Gerhardt
ATTORNEYS.

T 860,022

SN - 702899

March 25, 1969 C. B. RICHEY DEF. PUB.

SCARIFYING TOOTH ATTACHMENT

Filed Feb. 5, 1968 Sheet 2 of 2

INVENTOR.
CLARENCE B. RICHEY
BY
Tweedale & Gerhardt
ATTORNEYS.